United States Patent [19]

Gerkey

[11] 4,158,601
[45] Jun. 19, 1979

[54] NUCLEAR FUEL PELLET LOADING APPARATUS

[75] Inventor: Kenneth S. Gerkey, Mount Lebanon, Pa.

[73] Assignee: Westinghouse Electric Corp., Pittsburgh, Pa.

[21] Appl. No.: 796,244

[22] Filed: May 12, 1977

[51] Int. Cl.² .................... G21C 19/20; B66C 17/08
[52] U.S. Cl. ..................................... 176/30; 414/146
[58] Field of Search ........................ 176/30; 214/18 N

[56] References Cited

U.S. PATENT DOCUMENTS

| | | | |
|---|---|---|---|
| 3,149,045 | 9/1964 | Boyd | 176/30 |
| 3,677,328 | 7/1972 | Buzzi | 176/30 |
| 3,711,993 | 1/1973 | Liesch | 176/30 |
| 3,746,190 | 7/1973 | Hotz | 176/30 |
| 3,907,123 | 9/1975 | Howell | 214/18 N |
| 4,070,240 | 1/1978 | Kugler | 176/30 |

Primary Examiner—Samuel W. Engle
Assistant Examiner—Donald P. Walsh
Attorney, Agent, or Firm—L. A. DePaul; Z. L. Dermer

[57] ABSTRACT

Automatic apparatus for loading a predetermined amount of nuclear fuel pellets into a nuclear fuel element to be used in a nuclear reactor. The apparatus consists of a vibratory bed capable of supporting corrugated trays containing rows of nuclear fuel pellets and arranged in alignment with the open ends of several nuclear fuel elements. A sweep mechanism is arranged above the trays and serves to sweep the rows of fuel pellets onto the vibratory bed and into the fuel element. A length detecting system, in conjunction with a pellet stopping mechanism, is also provided to assure that a predetermined amount of nuclear fuel pellets are loaded into each fuel element.

6 Claims, 6 Drawing Figures

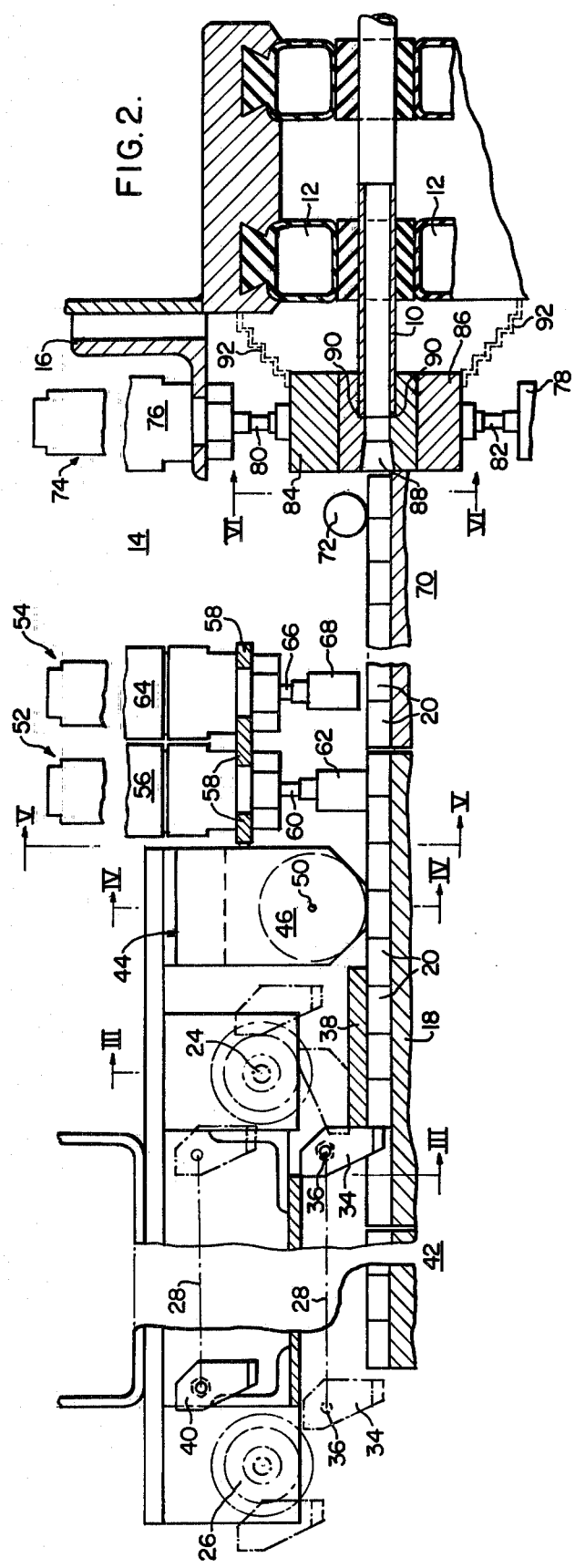
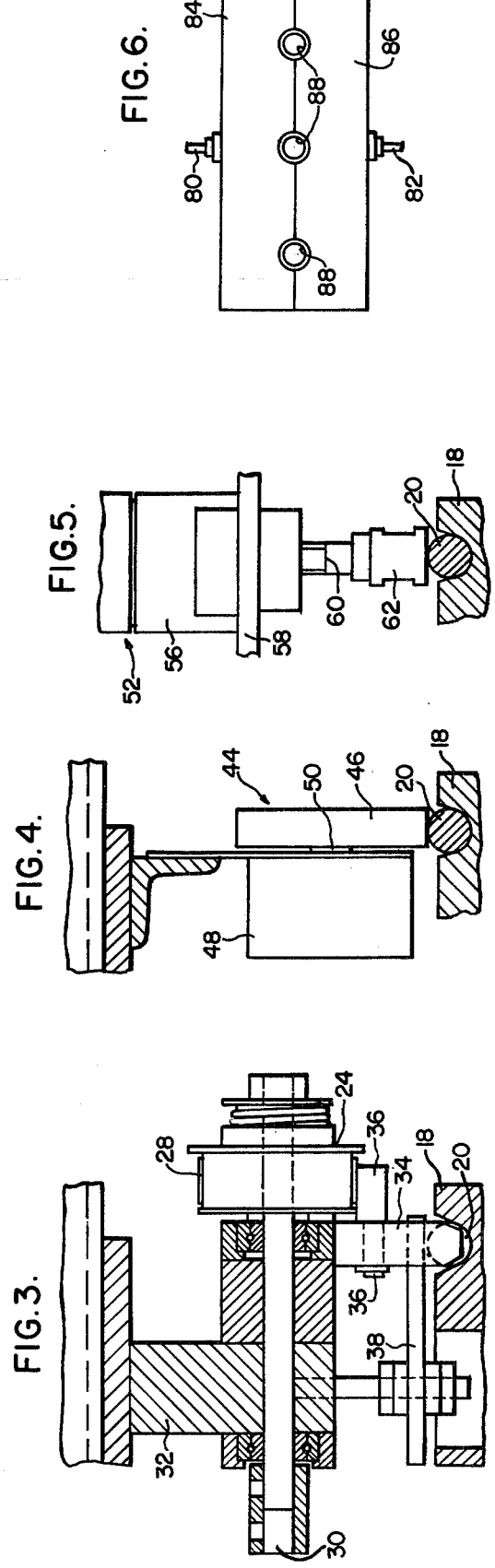

NUCLEAR FUEL PELLET LOADING APPARATUS

BACKGROUND OF THE INVENTION

This invention relates to the loading of nuclear fuel pellets into a nuclear fuel element and particularly to the automatic loading of fuel pellets from within a sealed compartment.

In many nuclear reactor designs, the reactor vessel has an inlet and an outlet for circulation of a coolant in heat transfer relationship with a core contained therein that produces heat. The core comprises an array or arrays of fuel assemblies which contain fuel elements. The fuel element is generally a cylindrical metallic sheath sealed at both ends containing nuclear fuel. The nuclear fuel which may be, for example, short cylindrical ceramic fuel pellets of a uranium compound is stacked in the fuel elements. During reactor operation, the nuclear fuel fissions thereby releasing fission products such as fission gas while generating heat in a manner well known in the art. The reactor coolant absorbs the heat while circulating through the core thereby cooling the fuel elements of the core and heating the coolant. Of course, the heated coolant may then be used to produce power in a conventional manner.

There are several methods known in the art for loading uranium fuel pellets into the cylindrical metallic sheath for use in a light water reactor. One such method comprises simply placing the fuel pellets in the metallic sheath by hand. Another known method involves placing corrugated metal trays with rows of fuel pellets thereon into alignment with several open fuel elements. Once in this position, the metal trays are vibrated while a person pushes on the ends of the rows of fuel pellets with a device that resembles a large comb, thereby causing several rows of pellets to be loaded into several fuel elements. These methods are possible because nonirradiated uranium fuel does not pose serious radiological problems to working personnel. However, when the nuclear fuel utilized is of a more toxic nature such as plutonium or a reprocessed uranium compound, then increased safeguards must be employed to prevent releasing radioactive contaminants to the atmosphere and to prevent overexposing working personnel. When such toxic fuel is employed, it is known in the art to use glove box handling techniques to hand load fuel pellets into individual fuel elements.

Typical manual glove box handling procedure first requires transferring the nuclear fuel pellets in a sealed container into the glove box and then firmly sealing the glove box. Once placed in the glove box, the sealed container may then be opened by manual gloved manipulation. The fuel pellets may then be loaded into a metallic sheath either totally enclosed within the glove box, or with its open end sealed into a glove box through a plastic membrane. When the metallic sheath has thus been filled to the proper level with fuel pellets, the fuel element must then be placed in a sealed container or its contaminated open end sealed off in order to be moved to the next glove box where the next procedure can be performed such as welding the end plug on the metallic sheath.

An example of an arrangement for mechanically loading nuclear fuel pellets into a fuel element is described in U.S. Pat. No. 3,746,190 to K. Hotz, issued July 17, 1973. The Hotz patent discloses the use of a magazine of nuclear fuel pellets contained within a gas-tight enclosure with a fuel element attached to the enclosure so that a motor driven bead chain mounted therein may push the pellet stack into the fuel element until the pellet stack comes into contact with the end plug at the end of the fuel element. While the Hotz patent does describe one way to load fule pellets into nuclear fuel elements, it does not teach a method to measure and control the amount of fuel pellets loaded into the fuel element.

SUMMARY OF THE INVENTION

Automatic apparatus disposed in a sealed compartment for loading a predetermined amount of nuclear fuel pellets into nuclear fuel elements to be used in a nuclear reactor. The apparatus consists of a vibratory bed capable of supporting corrugated metal trays that contain rows of nuclear fuel pellets. A sweep mechanism is arranged above the trays and serves to sweep the rows of fuel pellets onto the vibratory bed and into the fuel element. A length detecting system, in conjunction with a pellet stopping mechanism, is also provided to measure the length of fuel pellets loaded into the fuel element and to limit such loading, thereby assuring that a predetermined amount of nuclear fuel pellets are loaded into each fuel element.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings, wherein:

FIG. 2 is a partial cross-sectional view in elevation of the apparatus;

FIG. 3 is a view along line III—III of FIG. 2;

FIG. 4 is a view along line IV—IV of FIG. 2;

FIG. 5 is a view along line V—V of FIG. 2; and,

FIG. 6 is a view along line VI—VI of FIG. 2.

DESCRIPTION OF THE PREFERRED EMBODIMENT

Figure 1:
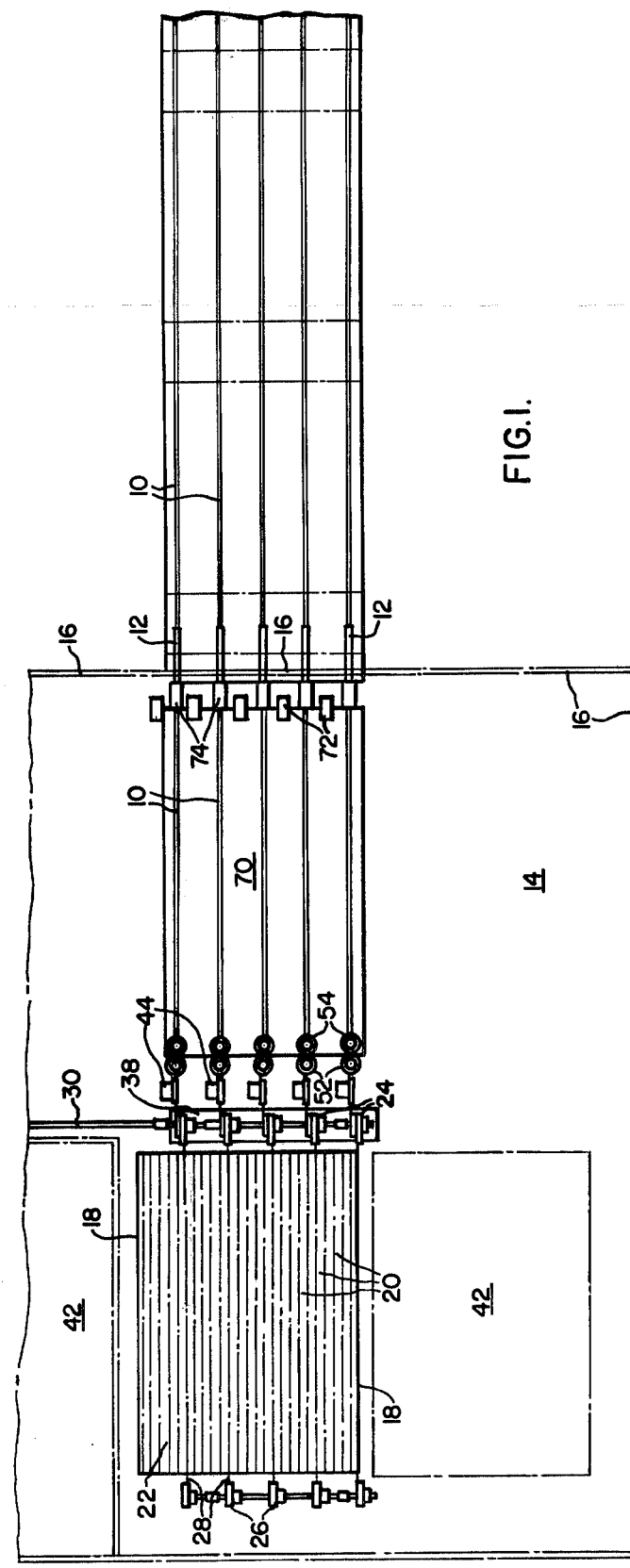
FIG. 1 is a plan view of the apparatus.

The use of plutonium or a reprocessed uranium compound in nuclear fuel pellets requires increased safeguards to prevent releasing radioactive contaminants to the atmosphere and to prevent overexposing working personnel. The invention described herein provides a mechanism for loading such nuclear fuel pellets into nuclear fuel elements while providing increased safeguards.

Referring to FIG. 1, a plurality of fuel elements 10 extend through a sealing mechanism 12 into an enclosure 14 defined by a gas-tight housing 16 so that apparatus hereinafter described may load fuel pellets into fuel elements 10. Fuel elements 10 may be cylindrical tubes having one end sealed and having the other end open with the open end extending into enclosure 14 through sealing meachanism 12 which is attached to housing 16. Sealing mechanism 12 may be of the type described in U.S. Pat. No. 4,070,240, filed Feb. 3, 1977 entitled "Seal Containment System" which is assigned to the assignee of the present application. Sealing mechanism 12 provides a mechanism whereby several fuel elements 10 may extend into enclosure 14 without allowing excessive contaminants to escape from enclosure 14 thereby allowing several fuel elements 10 to be automatically loaded with fuel pellets without exposing working personnel located outside housing 16.

Now referring to FIGS. 1 and 2, a corrugated steel tray 18 having a plurality of rows of nuclear fuel pellets 20 disposed in the corrugations is disposed in housing 16 in alignment with fuel elements 10. A sweep mechanism 22 is located above tray 18 and is capable of sweeping fuel pellets 20 off tray 18 toward fuel elements 10. Sweep mechanism 22 comprises a plurality of first gears 24 disposed over one end of tray 18 and a corresponding number of second gears 26 disposed over the other end of tray 18 while a number of drive lines 28 are wound around first gears 24 and second gears 26 so as to extend over the length of the rows of fuel pellets 20. The number of pairs of first gears 24, second gears 26, and drive lines 28 are chosen to correspond to the number of fuel elements 10 to be loaded at one time. In this particular case, five pairs are shown. A drive shaft 30 extends through housing 16 and has one end attached to first gears 24 and the other end attached to a motor (not shown) located outside housing 16. Under the activation of the motor (not shown) drive shaft 30 can rotate first gears 24 thereby driving sweep mechanism 22. However, first gears 24 are equipped with a friction clutch that disengages when a portion of sweep mechanism 22 encounters an obstruction.

Referring now to FIGS. 1, 2 and 3, sweep mechanism 22 further comprises a vertical support 32 for suspending drive shaft 30 above tray 18. A dog 34 is pivotally attached to rod 36 which in turn is attached to drive line 23 and extends downward so as to be able to contact the end of the row of fuel pellets 20. When the motor (not shown) rotates drive shaft 30, drive shaft 30 in turn rotates first gear 24 which causes drive line 28 to be advanced. Since dog 34 is attached to drive line 28, the advance of drive line 28 causes dog 34 to contact the end of the row of fuel pellets 20 which causes the row of fuel pellets 20 to be advanced along the corrugations in tray 18 toward fuel elements 10. A horizontal flat plate 38 is provided beneath first gears 24 and extends the width of tray 18 such that when dog 34 is advanced into contact with plate 38, dog 34 pivots in a vertical plane about rod 36 thereby disengaging the row of fuel pellets 20. A second dog 40 is provided on drive line 28 and spaced apart from dog 34 by the length of a row of fuel pellets 20 so that when dog 34 has completed advancing a row of fuel pellets 20, tray 18 may be shifted sideways one row and second dog 40 will be in a position to contact the next row of fuel pellets 20. Each set of first gears 24, second gears 26, and drive lines 28 may be spaced apart by a number of rows of fuel pellets 20 equal to the number of rows of fuel pellets 20 necessary to fill each fuel element 10. In this manner, when one row of fuel pellets 20 has been advanced by dog 34 on each drive line 28 and tray 18 has been shifted sideways, a second dog 40 on each drive line 28 is in a position to contact the end of a new row of fuel pellets 20. This arrangement allows more than one row of fuel pellets 20 to be loaded into each fuel element 10 without any manual manipulation. The spacing of drive lines 28 can be of various arrangements in conjunction with the use of more than one tray 18 in order to fill the chosen number of fuel elements as the need may suggest. To accomplish the sideways shift of tray 18, tray 18 may be mounted on a conveyor 42 which may also serve as a mechanism to remove an empty tray from enclosure 14 or to introduce a full tray into enclosure 14.

Referring now to FIGS. 1, 2, and 4, a rotary encoder 44 chosen from those well known in the art is suspended over the rows of fuel pellets 20 in line with each drive line 28 by means of a vertical attachment. Rotary encoder 44 consists of a circular disc 46 mounted in a vertical plane on body 48 by means of an axle 50 that extends into body 48. Disc 46 may have radial markings (not shown) that extend from axle 50 on the side facing body 48 while body 48 may contain a light reading device (not shown) capable of sensing the number of radial markings passing in front of the light reading device. Dog 34 causes the row of fuel pellets 20 to pass under disc 46 and in contact with disc 46 such that disc 46 is rotated about the axle 50. The light reading device then senses the number of radial markings passing through its beam and transmits the information to a recording instrument. By knowing the number of radial markings passing through the beam of the light reading device and by knowing the spacing of the radial markings, the length of fuel pellets 20 passing under disc 46 may be determined and displayed on a digital display (not shown) in view of the operator.

Referring to FIGS. 1, 2, and 5, a first stop 52 and a second stop 54 are disposed over the rows of fuel pellets 20 in line with each rotary encoder 46 and serve to selectively stop the flow of fuel pellets 20. First stop 52 comprises a first linear actuator 56 which may be an air cylinder supported on a horizontal support 58 with a first piston 60 extending downwardly from first linear actuator 56. First piston 60 has a first contact member 62 attached to the end thereof so as to be able to contact the fuel pellets 20 passing thereunder. First contact member 62 may be manufactured from nylon or an elastomer material so as to avoid damaging the fuel pellets 20 or contaminating them with foreign material. When energized, first linear actuator 56 causes piston 60 to descend which causes first contact member 62 to contact the fuel pellets 20 disposed thereunder, thereby stopping the flow of fuel pellets 20. Similarly, second stop 54 is supported by horizontal support 58 and comprises a second linear actuator 64, a second piston 66, and a second contact member 68 which are capable of performing a function similar to first stop 52.

Referring now to FIGS. 1 and 2, a vibratory bed 70 which may be chosen from those well known in the art is arranged between tray 18 and the open end of fuel elements 10. Vibratory bed 70 extnds under second stop 54 and is capable of vibrating the fuel pellets 20 thereon such that fuel pellets 20 are further advanced into fuel elements 10. Fuel pellets 20 are pushed off tray 18 by sweep mechanism 22 and onto vibratory bed 70 where they proceed to fuel elements 10. In addition, a photoelectric cell 72, chosen from those well known in the art, is provided in line with second stop 54 near the end of vibratory bed 70 that is capable of sensing the flow of fuel pellets 20 on vibratory bed 70.

Referring to FIGS. 1, 2, and 6, an indexing mechanism 74 is arranged near the end of vibratory bed 70 in line with each fuel element 10 to be loaded at once. Indexing mechanism 74 comprises an upper actuator 76 attached to housing 16 above the open end of fuel element 10 and a lower actuator 78 attached to housing 16 below the open end of fuel element 10. Both upper actuator 76 and lower actuator 78 may be of the air cylinder linear actuator type. An upper piston 80 extends from upper actuator 76 down to near fuel element 10 and a lower piston 82 extends upwardly from lower actuator 78 to near fuel element 10. An upper indexing block 84 is attached to the lower end of upper piston 80 while a lower indexing block 86 is attached to the upper end of lower piston 82. Upper indexing block 84 and lower indexing block 86 have semicircular bores 88 therein that substantially conform to the open ends of fuel elements 10 and to fuel pellets 20. Semicircular bore 88 has a lengthwise funnel shape back to notch 90 so that fuel pellets 20 entering through bore 88 may easily flow into fuel element 10. Notch 90 is a recessed portion of the indexing blocks that conforms to the ends of fuel elements 10 such that the metallic end of the fuel element 10 is covered by the indexing blocks while the inside of fuel element 10 remains accessible thereby providing a smooth transition from the indexing blocks into the open end of fuel elements 10. Notch 90 also limits the amount of contaminating dust that may accumulate on the outside of the open end of the fuel element 10 by covering that end while the fuel pellets 20 are loaded therein. A bellows seal 92 which may be chosen from those well known in the art is attached between the indexing blocks and housing 16 thereby providing a flexible sealing device therebetween. Once the open end of fuel element 10 has been introduced into enclosure 14 through sealing mechanism 12 and in alignment with sweep mechanism 22, indexing mechanisms 74 may be activated which causes upper piston 80 and lower piston 82 to be extended thereby causing upper indexing block 84 and lower indexing block 86 to firmly grasp the open end of fuel element 10 along notch 90.

OPERATION

Several fuel elements 10 are inserted through sealing mechanism 12 into enclosure 14 so that the open ends of fuel elements 10 are in alignment with the loading apparatus located in enclosure 14. It should be noted that while the drawings show the loading of five fuel elements 10 at once, any number of fuel elements 10 may be chosen to be loaded. At this point, indexing mechanism 74 is activated which causes upper indexing blocks 84 and lower indexing blocks 86 to firmly grasp the end of fuel element 10 along notch 90 so that bore 88 is in alignment with vibratory bed 70. At the same time a tray 18 containing a multiplicity of rows of fuel pellets 20 is aligned with sweep mechanism 22 by conveyor 42 such that a full row of fuel pellets 20 is aligned under each drive line 28. Second stop 54 is then activated which causes second contact member 68 to contact vibratory bed 70 in a position to stop the flow of pellets. The motor is then activated which causes drive shaft 30 to rotate which in turn causes the set of first gears 24 to rotate. The rotation of first gears 24 causes drive line 28 to advance around second gears 26 thereby causing dog 34 to contact the end of the row of fuel pellets 20. As dog 34 is advanced by drive line 28, the row of fuel pellets 20 is pushed through the corrugations of tray 18. Should one of the rows of fuel pellets 20 fail to advance because of an obstruction or because either first stop 52 or second stop 54 is activated, the friction clutch contained in first gears 24 will disengage, thereby preventing damage to the pellets. When the row of pellets has been advanced, so that dog 34 contacts plate 38, dog 34 pivots about rod 36 ending its contact with the row of pellets. At this point second dog 40 is in a position near the end of tray 18. The pushing action of dog 34 causes the row of pellets to pass under and in contact with disc 46 of rotary encoder 44 which records the length of fuel pellets 20 passing through. The action of dog 34 also causes the fuel pellets 20 to be advanced into contact with second contact member 68 thereby assuring that there is a solid row of pellets between rotary encoder 44 and second contact member 68. Second contact member 68 is then raised which allows the flow of pellets to continue onto vibratory bed 70. The vibratory action of vibratory bed 70 causes the fuel pellets to advance through bore 88 and into fuel element 10. As the fuel pellets 20 enter bore 88, they pass in front of photoelectric cell 72 which can determine if there is a gap in the flow of pellets. Since the distance between the point of contact on disc 46 and second contact member 68 is known, the total length of the row of fuel pellets which has passed beneath second contact member 68 and onto vibratory bed 70 can be calculated by substracting that known distance from the total length indicated by the rotary encoder 44. Because the total length of the row of fuel pellets passing onto vibratory bed 70 is the total length loaded into fuel elements 10, then this is the length that can be shown on the digital display. When a predetermined length of a row of fuel pellets has thus been indicated by rotary encoder 44, first stop 52 can be activated which stops the flow of fuel pellets moving onto vibratory bed 70 while those fuel pellets already on vibratory bed 70 continue into fuel element 10 under the action of vibratory bed 70. The stopping of the flow of pellets by first stop 52 causes the friction clutch of first gears 24 to disengage, thereby temporarily stopping that particular drive line 28. When photoelectric cell 72 senses that the flow of fuel pellets has stopped, vibratory bed 70 is automatically deactivated. Second stop 54 is then activated and first stop 52 is then released which allows the flow of pellets to resume until the pellets contact second contact member 68. This process assures that the length of pellets between the contact point of rotary encoder 44 and second stop 54 is the same for each cycle. Once fuel element 10 has thus been filled, indexing mechanism 74 can be released and fuel elements 10 removed. At this point conveyor 42 can be activated to remove the empty tray 18 and to align a full tray 18 while a new set of fuel elements 10 are introduced through sealing mechanism 12. It should be noted that should more than one row of fuel pellets from tray 18 be needed to fill a single fuel element, conveyor 42 may simply shift tray 18 over one row and allow the loading process to continue. In such a case, drive lines 28 will be located along the width of tray 18 so as to be separated by the number of rows of fuel pellets that are needed to fill one fuel element so that when tray 18 is shifted a full row of fuel pellets is aligned under each drive line 28. Therefore, the invention provides a system disposed in a sealed compartment having a mechanical sweep mechanism associated with a vibratory bed in conjunction with a length detecting and pellet stopping mechanism for automatically loading a predetermined amount of nuclear fuel pellets into nuclear fuel elements.

I claim as my invention:

1. Apparatus for loading a predetermined amount of nuclear fuel pellets into nuclear fuel elements comprising:
   a gas-tight housing having a sealing mechanism in the side thereof for accommodating the insertion of the open end of said fuel elements in a gas-tight manner;
   rows of nuclear fuel pellets disposed in colinear alignment with said open ends of said fuel elements for being loaded into said fuel elements;
   a drive shaft extending through said housing above and transverse to said rows of nuclear fuel pellets and being attached to a motor located outside said housing for providing a mechanism to load said fuel pellets; and a first gear disposed on said drive shaft, a second gear disposed on an axle arranged parallel to said drive shaft and above said rows of fuel pellets, a continuous drive line extending around said first gear and said second gear while being arranged substantially parallel to said rows of fuel pellets, and a dog pivotally attached to said drive line and extending downwardly into a position to contact said fuel pellets when said drive line is activated, said drive shaft being capable of rotating said first gear causing said drive line to move around said second gear thereby causing said dog to contact said fuel pellets, thus causing said fuel pellets to advance toward said fuel elements.

2. The apparatus according to claim 1 wherein said apparatus further comprises:

a vibratory bed disposed between said rows of nuclear fuel pellets and said fuel elements for vibrating said fuel pellets, thereby advancing said fuel pellets into said fuel elements.

3. The apparatus according to claim 2 wherein said apparatus further comprises:

a first stop arranged in substantial alignment with said rows of nuclear fuel pellets and said drive line and disposed above said rows of fuel pellets while extending down toward said fuel pellets for selectively contacting said fuel pellets thereby stopping said advance of said fuel pellets; and a second stop arranged in substantial alignment with said drive line and said first stop and disposed above said rows of fuel pellets while extending down toward said fuel pellets for selectively contacting said fuel pellets thereby stopping said advance of said fuel pellets, said first stop and said second stop together selectively stopping said advance of said fuel pellets.

4. The apparatus according to claim 3 wherein said apparatus further comprises:

an indexing mechanism arranged near the end of said vibratory bed for grasping said open ends of said fuel elements while said fuel pellets are loaded into said fuel elements.

5. The apparatus according to claim 4 wherein said indexing mechanism comprises:

an upper actuator attached to said housing above said open end of said fuel elements with an upper piston having one end disposed in said upper actuator and having an upper indexing block attached to the other end for selectively grasping said open end of said fuel elements with said upper indexing block; and a lower actuator attached to said housing below said open end of said fuel elements with a lower piston having one end disposed in said lower actuator and having a lower indexing block attached to the other end for selectively grasping said open end of said fuel elements between said upper indexing block and said lower indexing block.

6. The apparatus according to claim 5 wherein said apparatus further comprises:

a photoelectric cell disposed in alignment with said second stop near the end of said vibratory bed for sensing the flow of said fuel pellets on said vibratory bed.

* * * * *